F6966 XR 4,286,016

United States Patent [19]

Dimond et al.

[11] 4,286,016

[45] Aug. 25, 1981

[54] POUCH BLEACH

[75] Inventors: Harold L. Dimond; Raymond C. Odioso; Roger E. Reavill, all of Cincinnati, Ohio

[73] Assignee: The Drackett Company, Cincinnati, Ohio

[21] Appl. No.: 29,190

[22] Filed: Apr. 12, 1979

[51] Int. Cl.$^3$ .......................... B32B 5/18; B32B 3/26

[52] U.S. Cl. .................................. 428/311; 252/90; 252/95; 252/99; 8/108 R; 34/60; 15/244 R; 239/60; 428/381

[58] Field of Search ........................ 252/95, 99, 90; 8/108 R; 34/60; 15/244 R; 239/60; 428/281, 311

[56] References Cited

U.S. PATENT DOCUMENTS

| | | | |
|---|---|---|---|
| 3,154,495 | 10/1964 | Robson et al. | 252/99 |
| 3,634,260 | 1/1972 | Pickin | 252/95 |
| 3,945,936 | 3/1976 | Lucas et al. | 252/95 |
| 4,011,172 | 3/1977 | Marsan et al. | 252/90 X |

*Primary Examiner*—Mayer Weinblatt
*Attorney, Agent, or Firm*—Sharon A. Blinkoff; George A. Mentis

[57] ABSTRACT

A bleaching packet comprising a porous pouch containing a dry granular hypochlorite generating agent for the release of bleach in the aqueous medium of an automatic washing machine several minutes after the beginning of the wash cycle.

20 Claims, No Drawings

POUCH BLEACH

BACKGROUND OF THE INVENTION

Description

This invention encompasses an article designed to bleach fabrics in an automatic washing machine over a broad range of washing temperatures. The article comprises a porous receptacle in the form of a pouch which contains a dry granular hypochlorite generating bleaching agent. When this article is placed in the aqueous medium of an automatic washing machine at the beginning of the wash cycle, it will release an aqueous hypochlorite solution into the wash water several minutes after the beginning of the washing cycle.

Bleaching agents can be added to automatic washers in the context of a home laundering operation by the administration of a liquid or powdered bleach at the beginning of the wash cycle, or by addition of a water soluble packet containing bleach. The prior art packets dissolve readily in the aqueous medium of the washer. Administration by either of these two methods results in the instantaneous delivery of bleach into the wash water. Associated with the instantaneous delivery of bleach is the problem of high local concentrations of bleach. This instantaneous delivery results in a maximum concentration of bleach at the beginning of the wash cycle and a decrease in concentration during the wash cycle. Since the bleach is most concentrated at the beginning of the wash cycle, most of its work is performed at the beginning of the wash cycle. The detergent also does most of its work at the beginning of the wash cycle. Having the bleach and the laundry detergent acting at the same time decreases the efficiency of the bleach. Fluorescent whitening agents can be degraded by bleach when in solution. It is therefore advisable to delay release of bleach until fluorescent whitening agents have deposited on the fabrics.

There are several problems associated with administration of bleaches into an automatic washing machine in the context of the home laundry. The first problem is in measuring the proper amount of bleach in the case of the liquid or powdered bleach. The second problem is associated with high local concentrations. These high local concentrations cause fabric and color damage to clothing. A third problem which is encountered with the instantaneous administration of bleach is that which results from the continuous decrease in the concentration of bleach during the washing cycle. Increasing the initial concentration of the bleach to such a degree as to insure effective concentration of the bleach during the entire wash cycle would result in additional fabric and color damage.

Most detergents perform their function during the first 5–10 minutes of washing. Since bleach reacts less with soil suspended in wash water than with soil lodged in fabric, maximum fabric cleaning could be achieved by allowing the detergent to do its job and then adding bleach which would attack dirt remaining in the fabric. Thus maximum efficiency of bleaching agent would be achieved if bleach were to be administered after the laundry detergent had an opportunity to work. Delayed administration could be achieved by manually adding one of the existing bleaching agents to the wash water at approximately five minutes after the beginning of the wash cycle. However, this would be inconvenient and it would not solve the problem of high localized concentrations.

It is an object of this invention to provide an article which can be added at the beginning of the wash cycle which contains a pre-measured amount of bleaching agent and which will provide for the delayed release of bleach. Delayed administration of a bleaching agent maximizes the effectiveness of the bleach. Therefore less bleach is required to give the optimal results. Decreasing the amount of bleach minimizes fabric and color damage.

It is a further object of this invention to provide an article which releases bleach in such a manner as to avoid high localized concentrations of bleach, thus minimizing fabric damage.

U.S. Pat. No. 3,154,495 issued to Robson et. al. discloses a dispensing article which is designed to release a hypochlorite solution at a rate which is controlled by the porosity of the dispensing article. This patent does not teach a delay in the administration of bleach. Further, the dispensing article disclosed in this invention will not delay the administration of bleaching agent for a period of time.

U.S. Pat. No. 3,945,936 to Lucas et. al. discloses a porous dispensing article made of polyurethane which is designed to dispense a peroxygen bleaching agent into an automatic dryer. This patent teaches the use of the tumbling action in the dryer to sift peroxygen bleaching compositions through the pouch and onto damp fabric contained in the dryer.

The article of the present invention operates in an entirely different manner. Bleaching agent is dissolved inside the pouch by wash water flowing through the pouch. Once dissolved, the hypochlorite agent will pass through the pouch and into the wash tub where it then comes in contact with fabrics. The Lucas Patent is limited to peroxide bleaches which are not effective in the present invention since these bleaches will not operate efficiently over the wide range of temperatures encountered in automatic washers in the U.S. Further, this patent teaches a controlled continuous administration of bleach where bleach is released in the first ten to fifteen minutes by a sifting action. In the present invention, bleach is not released until several minutes after the beginning of wash cycle.

SUMMARY OF THE INVENTION

The present invention is drawn to a packet adapted for bleaching fabrics in an automatic washing machine over a broad range of temperatures usually encountered in the washing machine (from about room temperature to about 140° F. in the U.S. and up to 212° F. in those countries that heat wash water in the machine.) The article is comprised of a sealed porous pouch containing a substantially dry granular hypochlorite bleaching agent, where the pores of the pouch are open.

DETAILED DESCRIPTION OF THE INVENTION

In accordance with the present invention, a pouch is provided from materials which exhibit the hydrodynamic properties of being able to retard fluid flows for a period of time. Hydrodynamic properties mean those properties of a material which relate to the rate at which fluids pass through the material. Further, the material used for making the pouch exhibits a certain porosity and thickness, where the porosity and thickness of the material vary depending on the particle size of the bleaching agent. The thickness and porosity of the material used should cooperate with the particular granular bleaching agent, such that substantial amounts of bleaching agent will not be able to sift through the pouch prior to dissolution, and such that release of bleach can be delayed for a time after the beginning of the wash cycle. The delay may be generally characterized as the time required for delivery of a substantial fraction of the available chlorine to begin. This may be 1–10 minutes, but is preferably 3–5 minutes. (Granular size includes particles ranging in size from about 74 to about 2380 microns). Further, due to the thickness of the pouch and the agitation of the washing machine, bleaching agent is released in such a manner as to eliminate high local concentration of bleach. It is believed that the mechanism of diffusion control coupled with the agitation of the washing machine are responsible for the results achieved, however, we do not wish to be limited by any particular theory.

When the article of this invention is placed in a washing machine the hydrodynamic properties of the pouch material, described below, cooperate with the bleaching agent to delay the reaction of the bleaching agent with wash water. After this delay the bleaching agent will be dissolved by the wash water and then leached through the walls of the pouch. Due to the thickness and the average pore diameter of the material, the dry bleaching agent is kept from sifting through the pouch before it is dissolved. Also due to the thickness of the pouch material concentration gradients of bleaching agents are established which act to control the rate at which the bleaching agent is leached through the pouch. This coupled with the agitation in the machine acts to disperse the bleach uniformly through the tub of the washing machine so as to avoid high local concentrations of bleach.

The pouch is made from material which exhibits the hydrodynamic properties of delaying the leaching of the bleaching agent for appoximately 1–10 minutes from the initiation of the wash cycle. Examples of operative materials which are suitable for the purposes of this invention are those materials exhibiting pressure drops of 6.2 to 2.7 inches of water, 4.2–1.8 inches of water, 2.2–0.9 inches of water, and 0.88–0.38 inches of water when a one inch thick piece of material is exposed, respectively to air streams of 800 $ft^3$/min., 600 $ft.^3$/min., 400 $ft^3$/min., and 200 $ft^3$/min., at atmospheric pressure. In addition to the required hydrodynamic properties, the material should be relatively homogeneous with a substantially uniform porosity where the average cell diameter is from about 130 to about 230 microns. The material should also have a thickness such that a concentration gradient of bleaching agent can be established across the material from inside to outside the pouch. Further, the material must be water insoluble and relatively inert with respect to the hypochlorite generating agent.

Materials having the characteristics recited above can be selected from a variety of foamed materials in the open pore form such as polyethylene, polypropylene, cellulose, urethanes of either the ester or ether type, foamed rubbers, or felts (compressed foam); layered materials forming a pad such as cloth woven or unwoven; or foam-like material of a rigid nature such as the ceramics or metals.

The preferred materials for the pouch are the reticulated or open pore polyurethane foams. These foams can be either of the ether or ester type. Although as previously stated the thickness and porosity can vary depending on the particle size of the bleaching agent, the foams used are from about $\frac{3}{8}$–1 inch thick and have a substantially uniform number of pores with an average pore diameter ranging from about 130 to about 230 microns. The preferred foams would be $\frac{3}{8}$–$\frac{1}{2}$ of an inch thick and have an average pore diameter of from about 140 to about 210 microns. Foams of this type are commercially available.

The bleaching agents suitable for use in this invention are those water soluble substantially dry solid materials which generate hypochlorite ions when dissolved in water. Examples thereof are the heterocyclic N-chloroimides such as trichlorocyanuric acid, dichloroisocyanuric acid and salts thereof, such as potassium dichloroisocyanurate, sodium dichloroisocyanurate and sodium dichloroisocyanurate dihydrate. Other imides may also be used such as N-chlorosuccinimide, N-chloromalonimide, N-chlorophthalimide, and [(monotrichloro)-tetra-(mono-potassium dichloro)]-pentaisocyanurate. Other imides which are useful are hydantoins such as 1,3-dichloro-5,5-dimethylhydantoin, N-monochloro-5,5-dimethylhydantoin, methylene-bis (N-chloro-5,5-dimethylhydantoin), 1,3dichloro-5-methyl-5-iso-butylhydantoin, 1,3-dichloro-5-methyl5-ethylhydantoin, 1,3-dichloro-5,5-diisobutylhydantoin, 1,3-dichloro-5-methyl-5-n-amylhydantoin. Also useful are various inorganic compounds such as lithium hypochlorite, calcium hypochlorite and chlorinated trisodium phosphate. Additional useful organic compounds are trichloromelamine, N-chloromelamine, monochloramine, dichloramine, paratoluene sulfondichloroamide, N,N-dichloroazodicarbonamide, N-chloroacetyl urea, N,N-dichlorobiuret, chlorinated dicyandiamide, dichloroglycoluril, N,N-dichlorobenzoylene urea, and N,N-dichloro-p-toluenesulfonamide.

These hypochlorite-generating agents are used in the form of granular particles. The particle size is from about 74 to about 2380 microns. Particles within this range can be obtained from passing solid material through U.S. Standard sieves of between 8–200 sizes. The preferred particle size is from about 149 to about 1190 microns. Particles within this range can be obtained from passing solid material through U.S. Standard sieves of between 16–100 sizes. The more preferred particle size is from about 177 to about 840 microns. Particles within this range can be obtained by passing solid material through U.S. Standard sieves having 20–80 sizes. The range of particle size is important in order to keep the bleaching agent from sifting through the pouch and to delay the rate at which the hypochlorite bleaching agent dissolves.

The pouch of this invention can be fabricated in a number of ways and can vary as to size and shape. The size of the pouch will vary depending on the amount of bleaching agent or charge contained in the pouch. Further, it is understood that although the rate at which bleaching agent leaches through the pouch is for the most part controlled by the pouch material and the size of the bleaching particles, substantial changes in the surface area of the pouch will also affect the rate at which bleaching agent is leached through the pouch. Therefore, the size of the pouch has an effect on the rate at which particles are leached through the pouch.

The amount of bleach used depends on the type of clothing being washed, the size of the wash, and the amount of soil present in the fabrics. It has been found that effective bleaching results can be obtained in a standard size automatic washer by using a weight of bleaching agent that will provide to the wash liquor between 30 and 300 ppm available chlorine, when all possible chlorine has been liberated. Hypochlorite generating agents will vary in the amount of chlorine liberated. In practice a charge of bleaching agent of approximately 3 to 15 grams will provide effective bleaching action.

In the context of a standard size automatic washer optimal results have been achieved by using approximately 10 grams of a particular bleaching agent. The preferred range of pouch size required to both hold this amount of bleach and cooperate to give the proper delayed release of bleach are those having exposed surface areas ranging from about 2 square inches to about 32 square inches. Exposed surface area includes any wall of the pouch through which bleaching agent is dispensed into the wash liquor. For example the pouch may have any number of walls at least one of which provides for the leaching of the bleaching agent into the wash water. Thus a suitable pouch may have at least one wall which is impervious provided the necessary exposed and effective surface area is present.

In its preferred form the pouch is fabricated from $\frac{3}{8}$–$\frac{1}{2}$ inch thick open pore polyurethane material having an average pore diameter of from about 140 to about 210 microns. The pouch is constructed by taking two, three inch square pieces of this polyurethane material and fusing three corresponding edges of the two sheets by well known heat sealing techniques. Approximately 10 grams of potassium dichloroisocyanurate are placed inside the pouch through the open end, which is then sealed by the same heat sealing techniques.

The pouch of this invention is used in the following manner. A pouch is added to an automatic washer at the beginning of a normal wash cycle along with soiled fabrics and detergent. Approximately 1-10 minutes after the initiation of the wash cycle, the bleaching agent starts leaching through the pouch and is dispersed uniformly through the tub, thereby providing bleaching agent for the fabrics in the washer.

The following examples illustrate the present invention.

EXAMPLE I

Four bleach-containing pouches were constructed. Each was made from $\frac{1}{2}$ inch thick polyurethane foam (Ester type) having a uniform porosity and an average pore diameter of 150 microns, where the pores were reticulated or open. The pouches were fabricated by fusing 3 corresponding edges of two 3 inch square sheets of polyurethane material, filling the pouches with bleaching agent through the open end of the pouch, and then sealing this open end. Three of the four pouches were filled with 10.45 grams of granular potassium dichloroisocyanurate[1] (177–1190 microns) and the fourth pouch was filled with 10 grams of the granular potassium dichloroisocyanurate (177–1190 microns). Each pouch was then added to a separate wash. Each of the four washes was conducted as follows:

[1]Monsanto ACL-59 granular potassium dichloroisocyanurate used in Examples I-IV.

A 15 minute wash cycle was begun in a standard automatic washing machine. The water temperature was set at 110° F. Once the tub of the machine was filled with water, three types of soil-free cloth were added, a mixture of old and new denim, assorted dye-sensitive test cloths, and terry towels. After adding the cloths 95.2 grams of 6.1 percent phosphorus detergent were added. When the machine began to agitate, a bleach-filled pouch was added. Fifty ml. aliquots of wash water were removed at one, two, or three minute intervals during the fifteen minute wash cycle. This water was removed by use of a filter-equipped syringe. After 15 minutes the washer was set to "spin" to complete the rinsing cycle.

At the end of each of the four washes the cloths used were dried and visually inspected for dye damage. No bleach spotting or streaking was observed. The 50 ml. samples taken during the four washes were individually treated with 10 ml. of acetic acid and 10 ml. of potassium iodide solution.

Titration with standard thiosulfate solution gave data which translated into ppm available chlorine at each sampling time. The following table shows the ppm available chlorine at each sampling time for each of the four pouches used. The three washes conducted with pouches filled with 10.45 grams of bleaching are labeled washes A, B and C. The wash conducted with the fourth pouch which was filled with only 10 grams of bleaching agent is labeled wash D.

Chlorine Concentration vs. Time in Minutes

| Time | | 1 | 2 | 4 | 6 | 8 | 10 | 12 | 15 |
|---|---|---|---|---|---|---|---|---|---|
| TEST | A | 2 | 2 | 40 | 60 | 53 | 48 | 44 | 39 |
| WASH | B | 6 | 56 | 89 | 89 | 89 | 88 | 87 | 86 |
| RUNS | C | 4 | 6 | 35 | 57 | 52 | 46 | 39 | 39 |
| | D | 1 | 21 | 50 | 49 | 45 | 45 | 38 | 37 |

Results for A–D expressed as ppm available chlorine

EXAMPLE II

A bleach-containing pouch was constructed from $\frac{5}{8}$ inch thick polyurethane foam material having a uniform porosity and an average pore diameter of 150 microns, where the pores were reticulated or open. The pouch was again made by fusing 3 corresponding edges of two 3 inch square sheets of this polyurethane material. The pouch thus formed was then filled with 10.45 grams of granular potassium dichloroisocyanurate (177–1190 microns) and sealed.

This pouch was then added to a test wash which was put together in exactly the same manner as the washes conducted in Example I. As in Example I fifty ml. aliquots of wash water were removed at one, two, or three minute intervals and tested for ppm available chlorine at each sampling time. The following chart shows the ppm available chlorine at each sampling time.

Chlorine Concentration vs. Time in Minutes

| TIME | 1 | 2 | 4 | 6 | 8 | 10 | 12 | 15 |
|---|---|---|---|---|---|---|---|---|
| WASH E | 1 | 23 | 91 | 90 | 89 | 89 | 89 | 88 |

Results expressed as ppm available chlorine

EXAMPLE III

A bleach-containing pouch was constructed from $\frac{3}{8}$ inch thick polyurethane foam material having a uniform porosity and an average pore diameter of 200 microns, where the pores were reticulated or open. Again, the pouch was made by fusing 2, 3 inch square sheets of this polyurethane material. The pouch thus formed was then filled with 10.45 grams of granular potassium dichloroisocyanurate (177–1190 microns).

This pouch was then added to a test wash which was put together in exactly the same manner as the washes conducted in Example II. As in Example I, fifty ml. aliquots of wash water were removed at one, two, or three minute intervals and tested for ppm available chlorine at each sampling time. The following chart shows the ppm available chlorine at each sampling time.

| Chlorine Concentration vs. Time in Minutes | | | | | | | | |
|---|---|---|---|---|---|---|---|---|
| TIME | 1 | 2 | 4 | 6 | 8 | 10 | 12 | 15 |
| WASH F | 56 | 86 | 100 | 99 | 99 | 99 | 99 | 98 |

Results expressed as ppm available chlorine

EXAMPLE IV

A bleach containing pouch was constructed from ¼ inch thick polyurethane foam material having a uniform porosity with an average cell diameter of 200 microns, where the pores were unreticulated (incomplete rupture of pores resulting in both open and closed pores). Again, the pouch was made by fusing three edges of two, 3 inch square sheets of the polyurethane material. The pouch thus formed was then filled with 10 grams of granular potassium dichloroisocyanurate (177–1190 microns).

This pouch was added to a test wash which was put together in exactly the same manner as the washes conducted in Example I.

Fifteen minutes later the pouch was removed from the wash and cut open. Based on visual observation of what was left in the pouch almost no bleach was released. This example illustrates that a pouch made from porous material where only some of the pores are open, will not permit all of the bleaching agent to leach through the pouch in the desired time. Therefore such material is not suitable for use in this invention.

EXAMPLE V

A bleach containing pouch was constructed from ¼ inch thick polyurethane foam material having a uniform porosity with an average cell diameter of 200 microns, where the pores were reticulated or open. Again, the pouch was made by fusing three edges of two, 3 inch square sheets of the polyurethane material. The pouch thus formed was then filled with 10 grams of granular potassium dichloroisocyanurate (149–840 microns).

This pouch was not added to a test wash. Before it could be added to a wash, some of the bleaching agent sifted through the pouch. This example illustrates that using a smaller particle size in conjunction with a thin pouch material will permit bleaching agent to sift through the pouch.

Having described some typical embodiments of the invention it is not our intent to be limited to the specific details set forth herein. Rather, we wish to reserve to ourselves any variations or modifications that may appear to those skilled in the art and fall within the scope of the following claims.

What is claimed is:

1. A packet adapted for bleaching fabrics in an automatic washer consisting essentially of:

A water-insoluble closed pouch containing from about 3 to about 15 grams of a substantially dry, water soluble granular hypochlorite generating bleaching agent having a particle size ranging from about 74 to about 2,380 microns;

said pouch being of a substantially open pore material selected from the group consisting of foamed polyethylene, foamed polypropylene, foamed cellulose, foamed polyurethane of either the ether or ester type, and woven or unwoven cloth; and said open pore material having an average pore diameter of from about 130 to about 230 microns and a thickness of about ⅜ inch to about 1 inch;

whereby the particle size of the granular hypochlorite generating bleaching agent is selected so that in cooperation with the porosity and the thickness of the pouch the leaching of said bleaching agent through the pouch will be delayed by from about 1 to 10 minutes from the initiation of the wash cycle.

2. A packet according to claim 1 wherein the granular hypochlorite generating bleaching agent is selected from the group consisting of the alkali metal salts of dichloroisocyanuric acid.

3. A packet according to claims 2 wherein the pouch is made of polyurethane foam.

4. A packet according to claim 3 wherein the average pore diameter is from about 140 to about 210 microns.

5. A packet according to claim 3 wherein the particle size of the bleaching agent is from about 149 to about 1190 microns.

6. A packet according to claim 5 wherein the polyurethane material is about ½ of an inch thick.

7. A packet according to claim 5 wherein the polyurethane material is about 1 inch thick.

8. A packet according to claim 5 wherein the polyurethane material is about ⅜ of an inch thick.

9. A packet according to claim 8, 6 or 7, wherein the average pore diameter is from about 140 to about 210 microns.

10. A packet according to claim 5 wherein the pouch has an effective surface area of about 12.5 square inches; and wherein the average pore diameter is from about 140 to about 210 microns.

11. A packet according to claim 10 wherein the wherein amount of the bleaching agent is about 10 grams; and wherein the bleaching agent is potassium dichloroisocyanurate.

12. A packet according to claim 3 wherein the particle size of the bleaching agent is from about 177 to about 840 microns.

13. A packet according to claim 12 wherein the polyurethane material is about ½ of an inch thick.

14. A packet according to claim 12 wherein the polyurethane material is about 1 inch thick.

15. A packet according to claim 12 wherein the pouch has an effective surface area of about 12.5 square inches; and wherein the average pore diameter is from about 140 to about 210 microns.

16. A packet according to claims 12 or 20 wherein the amount of the bleaching agent will provide between 30 to 300 ppm available chlorine to the wash liquor, when all possible chlorine has been liberated.

17. A packet according to claim 12 wherein the polyurethane material is about ⅜ of an inch thick.

18. A packet according to claims 17, 13 or 14, wherein the average pore diameter is from about 140 to about 210 microns.

19. A packet according to claim 3 wherein the pouch has an effective surface area of from about 2 to about 32 square inches.

20. A packet according to claim 19 wherein the pouch has an effective surface area of about 12.5 square inches.

* * * * *